United States Patent [19]
Ohshima et al.

[11] Patent Number: 5,715,384
[45] Date of Patent: Feb. 3, 1998

[54] REAL-TIME IMAGE DISPLAY METHOD AND APPARATUS DISPLAYING TWO DIFFERENT VISUAL RESOLUTIONS

[75] Inventors: Toshikazu Ohshima, Kawasaki; Hiroyuki Yamamoto, Chiqasaki; Shinji Uchiyama, Yokohama, all of Japan

[73] Assignee: Canon Kabushiki Kaisha, Tokyo, Japan

[21] Appl. No.: 384,530

[22] Filed: Feb. 1, 1995

[30] Foreign Application Priority Data

Feb. 2, 1994 [JP] Japan .................................. 6-011025

[51] Int. Cl.$^6$ .................................................. G06T 3/40
[52] U.S. Cl. .............................. 395/128; 395/119; 356/12
[58] Field of Search .................................. 395/118–20, 126, 395/130, 128, 132–3; 348/42–53; 356/12; 359/375–8, 458, 462–73; 600/166–7

[56] References Cited

U.S. PATENT DOCUMENTS

| | | | |
|---|---|---|---|
| 4,984,179 | 1/1991 | Waldern | 364/514 |
| 5,293,187 | 3/1994 | Knapp et al. | 351/210 |
| 5,345,281 | 9/1994 | Taboada et al. | 351/210 |
| 5,360,971 | 11/1994 | Kaufman et al. | 250/221 |
| 5,400,177 | 3/1995 | Petitto et al. | 359/451 |
| 5,422,653 | 6/1995 | Maguire, Jr. | 345/7 |
| 5,422,689 | 6/1995 | Knapp et al. | 351/208 |
| 5,446,834 | 8/1995 | Deering | 395/127 |
| 5,467,104 | 11/1995 | Furness, III et al. | 345/8 |

FOREIGN PATENT DOCUMENTS

| | | |
|---|---|---|
| 0577085 | 1/1994 | European Pat. Off. . |
| WO8802156 | 3/1988 | WIPO . |

OTHER PUBLICATIONS

Iwamoto, Kazuyo, et al "Development of Eye Movement Tracking Type Head Mounted Display: System proposal and evaluation experiments", *IEEE International Workshop on Robot and Human Communication*, pp. 287–291, Jul. 1993.

Robinett, Warren, et al, "A Computational Model for Stereoscopic Optics of a Head–Mounted Display", *Presence*, vol. 1, No. 1, winter 92, pp. 45–62.

White, Preston K., "Spatially Dynamic Calibration of an Eye-Tracking System", IEEE Transactions on Systems, Man and Cybernetics, pp. 1162–1168, Jul. 1993.

Myers, Glenn A., "Eye Monitor: Microcomputer–Based Instrument Uses an Internal Model to track the Eye", *Computer Magazine*, vol. 24, No. 3, pp. 14–20, Mar. 1991.

Yamada, Mitsudo, et al, "A New Eye Movement Analyzer: Auto Calibration and Wireless Transmission", *Engineering in Medicine and Biology, 9189 International Conference*, pp. 861–863.

Biodata Engineering, by Okewatari, published 1971 by Corona.

*Primary Examiner*—Joseph H. Feild
*Assistant Examiner*—Rudolph Buchel
*Attorney, Agent, or Firm*—Fitzpatrick, Cella, Harper & Scinto

[57] ABSTRACT

Real-time image processing apparatus and method for displaying two different visual resolutions includes structure and steps for detecting a position on a display screen at which an operator is looking. A center area of a predetermined size is determined and includes the detected position at which the operator is looking and another area different from the center area. Structure and steps are provided for determining a first image generation algorithm for a first image to be displayed on the center area and a second image generation algorithm for a second image to be displayed on another area. The first and second image generation algorithms are different from each other. Structure and steps are provided for generating the first and second images using the first and second image generation algorithms, respectively. Structure and steps are provided for causing a display of the first and second images together and having different visual resolutions.

23 Claims, 11 Drawing Sheets

| FIGURE UNIT SERIAL NO. | FIGURE TYPE | FIGURE DATA |
|---|---|---|
| 1 | TRIANGLE | COORDINATES OF VERTEX, CONNECTION, COLOR |
| 2 | CHR TRAIN | FONT DATA, COORDINATES, CHR SIZE |
| 3 | SPHERE | RADIUS, COORDINATES, COLOR, TEXTURE |
| 4 | FREE CURVED SURFACE | CONTROL POINT, COLOR TEXTURE |
| ... | | |

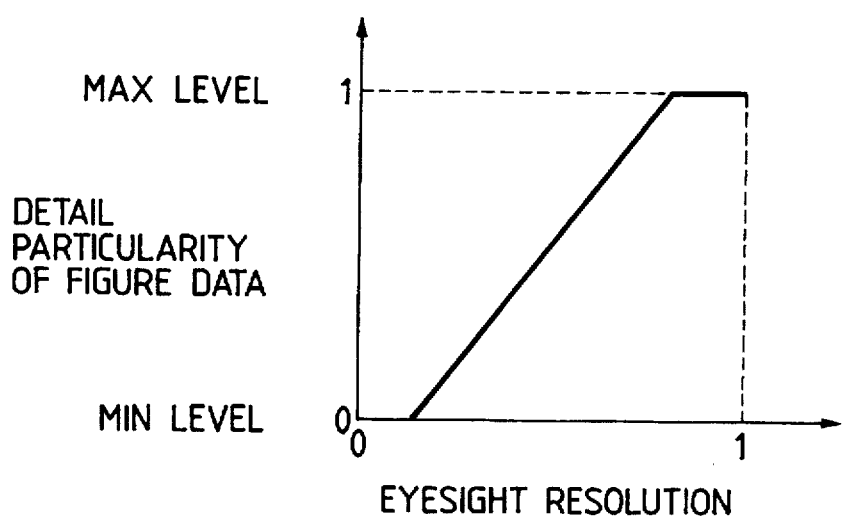

NO. OF POLYGONS DRAWN
SMALLER ←——————————→ LARGER
LOWER ←——————————→ HIGHER
DETAIL PARTICULARITY

TEXTURE DATA RESOLUTION
LOWER ←——————————→ HIGHER
LOWER ←——————————→ HIGHER
DETAIL PARTICULARITY

REAL-TIME IMAGE DISPLAY METHOD AND APPARATUS DISPLAYING TWO DIFFERENT VISUAL RESOLUTIONS

BACKGROUND OF THE INVENTION

1. Field of the Invention

The present invention relates to an image display method and an apparatus therefor, and in particular, to a real-time image display method and an apparatus therefor for interpreting geometric graphic data such as fonts, plan figures, solid figures, attribute data relating to such as colors or patterns therefor, and scene description data relating to lighting, projection or the like, and for calculating and creating new images at short time intervals which are greater than several frames per sec in order to sequentially update display images.

2. Related Background Art

Heretofore, images to be displayed on a screen have been created over all of the area of the screen with the use of one and the same image creating algorithm even though real-time image creating and dialing processes for displaying dynamic images or the like have been attractively noticed.

The real-time image creation and display has a tendency that the real-time ability has, in general, a priority to the quality of an image to be displayed, and accordingly, it is necessary to simplify the image creating algorithm to relieve the burden caused by the calculations in order to ensure the real time ability.

However, the above-mentioned conventional process has offered such a defect that the operator distinctly perceives a lowered quality of an image since the image quality is uniformly deteriorated over all of the area of the screen since in the above-mentioned conventional process when the image creating algorithm is simplified.

In view of such a defect inherent to the conventional process, an expensive high speed computer exclusively used for creating an image, should have been used in order to ensure a satisfactory image quality while maintaining a real-time ability. Even so, a sufficient image quality has not always been able to be obtained.

SUMMARY OF THE INVENTION

As to the human visibility, it has been known that the resolution is highest at a gazing point, but is remarkably low at a point distant from the gazing point. For example, the resolution in a direction having an angle of 30 deg. from a gazing direction is about 1/5 of the resolution at the gazing point ("BIODATA ENGINEERING" written by Okewatari, published 1971 by CORONA). Thus, images in a zone around a gazing point, that is, in the so-called central vision area, are particularly important in visual information for the operator among displayed images. Meanwhile, a zone at the periphery of the center vision area, that is, a peripheral vision area only has a role assistant to the center vision area.

According to the present invention, images can be created by different image creating algorithms between the center and peripheral vision areas. Namely, the above-mentioned human visual characteristic is used, that is, images in the center vision area are created by using a superior algorithm while images in the peripheral vision area are created by using an algorithm having a relatively low burden so that the burden upon calculation for the entire image can be reduced while the real-time ability can be maintained, thereby one object of the present invention is to exhibit a satisfactory image to the operator.

Further, the present invention is devised in order to eliminate the above-mentioned disadvantages, so as to provide a real-time display method and an apparatus therefore, which can create an image having a satisfactory image quality while maintaining a real-time ability.

To that end, according to the present invention, there is provided an image display method comprising: a first step of identifying each of parts of an image to be displayed on a display screen, with a vision position which falls in the visual field of an operator, a second step of determining a visual resolution at the vision position identified at the first step, a third step of determining means for creating the image and parameters therefor for each of vision parts of the image in accordance with the resolution identified at the second step, a fourth step of creating an image of each of the vision parts with the use of the means and the parameters determined at the third step, and a fifth step of displaying each of the vision parts created at the fourth step.

BRIEF DESCRIPTION OF THE DRAWINGS

FIG. 8 is a view for explaining a selection for image creating parameters in the first embodiment of the present invention;

FIG. 9 is a view for explaining a selection of a drawing figure data in accordance with a detail particularity of figure data;

DETAILED DESCRIPTION OF THE PREFERRED EMBODIMENTS

Explanation will be hereinbelow made of embodiments of the present invention with reference to the accompanying drawings.

(First Embodiment)

In a real-time image display apparatus in the first embodiment of the present invention, a position and a posture of the head of the operator and a direction of eyesight are measured with the use of a position and posture detector and an eye movement detector which the operator has worn at his head, and are inputted as data. Further, an eye point and an eye sight are calculated using a screen in a display apparatus as a reference, from these data.

Next, a position where each of figure units on the screen falls onto the retina of the operator is identified in accordance with an angle between a direction from the eye point to each of the figure units and the direction of the eye sight.

Further, an algorithm for creating an image of each of the figure units falls on the position, and control parameters are selected for each of the figure units in accordance with a degree of visual resolution. Upon the selection of the image creating algorithm and the determination of the control parameters, the quality of an image which falls onto a position where the visual resolution is high is set to be high, and the burden of calculation of an image which falls onto a position where the visual resolution is restrained to a low value. Accordingly, it is possible to reduce the burden of calculation over the whole image while maintaining the quality of images which the operator perceives to be high.

Further, the figure units are created with the use of the image creating algorithms and the parameters which are determined therefor.

A detailed explanation will be hereinbelow made of the operation of an image display apparatus in the first embodiment.

Figure 1:
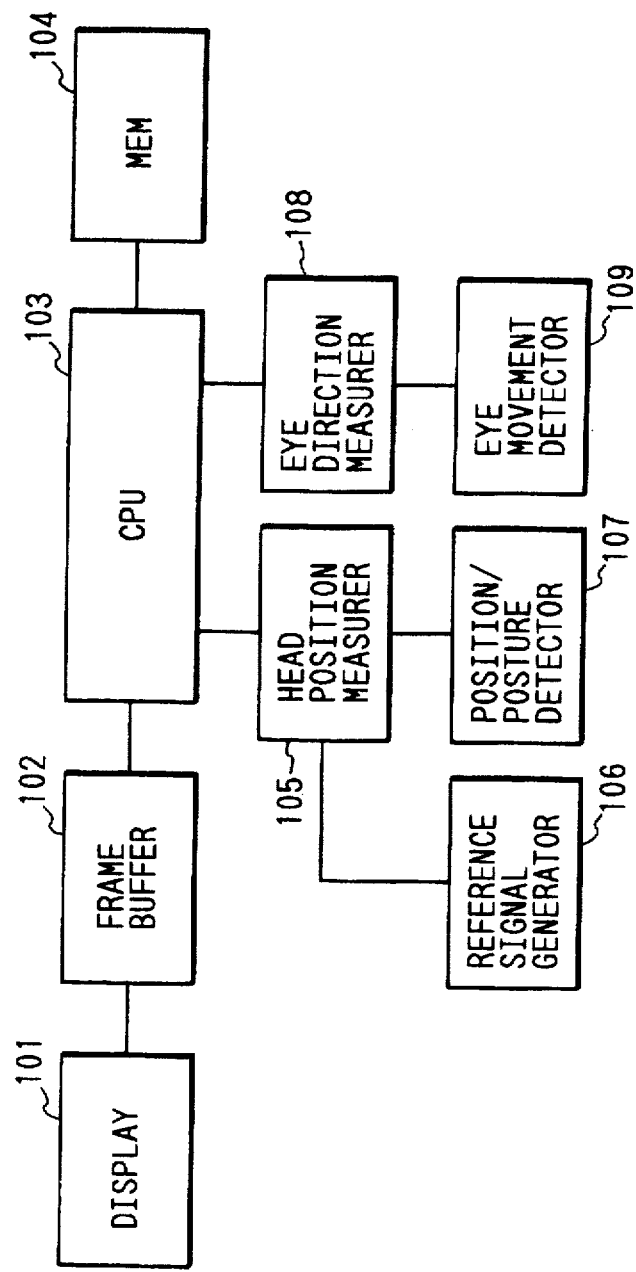
FIG. 1 is a block diagram illustrating a basic arrangement of a first embodiment of the present invention.

Referring to FIG. 1 which is a block diagram illustrating a basic arrangement of a real-time image display apparatus 101 for exhibiting an image to the operator in the first embodiment, the real-time image display apparatus 101 is composed of a CRT display unit, an LCD display unit or the like. A frame buffer 102 stores therein figure data to be displayed on the image display apparatus 101, a CPU 103 executes a process in accordance with a procedure stored in a memory device 104 so as to create image data, and controls several devices. Image data created by the CPU 103 are stored in the frame buffer 102.

The memory device 104 for storing the procedure for the CPU 103, and data necessary for processing, and is also used as a work area for the CPU 103.

The storage device 104 stores therein a control program indicated in a flow-chart which will be described later with reference to FIG. 3, data relating to a figure to be drawn, and data required for processing.

The head position measurer 105 analyzes a signal from the position and posture detector 107, and outputs data relating to a position and a posture of the head of the operator based upon a reference signal generator 106, to the CPU 103.

The reference signal generator 106 delivers a signal which serves as a reference for the position and posture detector 107 for detecting the head and posture of the operator.

An eyesight direction measuring device 108 analyzes a signal from the eye movement detector 109, and delivers data relating to an eye sight direction based upon the head of the operator to the CPU 103.

The eye movement detector 109 detects a direction in which the eye of the operator is directed.

Figure 2:
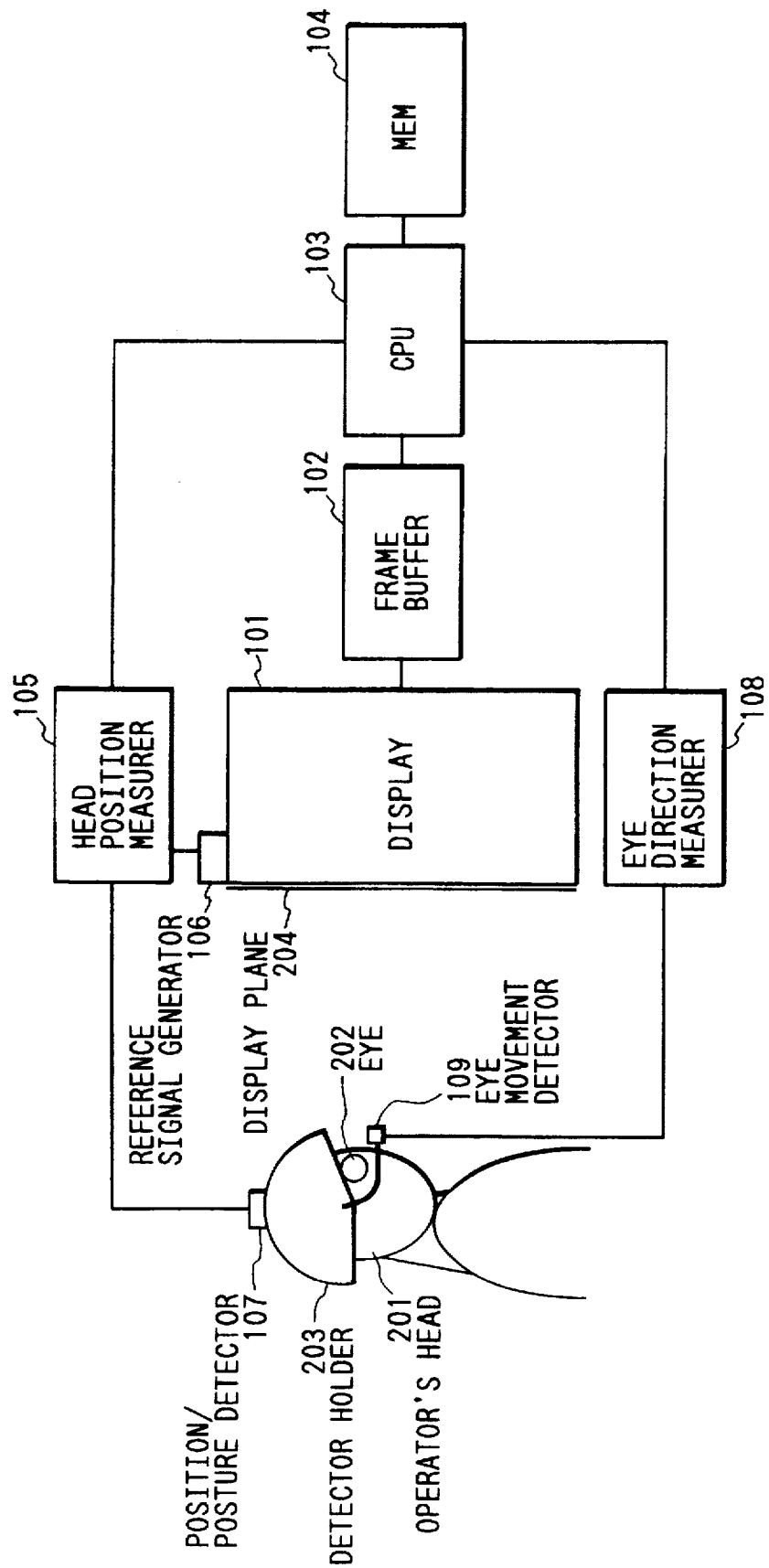
FIG. 2 is a view schematically illustrating positions of detectors in the first embodiment of the present invention.

Referring to FIG. 2 which is a view illustrating schematic positions of detectors constituting the real-time image display apparatus in the first embodiment, the reference signal generator 102 is fixed to the upper part of the image display apparatus 101. Further, the position and posture detector 107 and the eye movement detector 109 are fixed to the head of the operator, the eye movement detector 109 being mounted in front of the eye of the operator. The other devices can be arranged at arbitrary positions.

Figure 3:
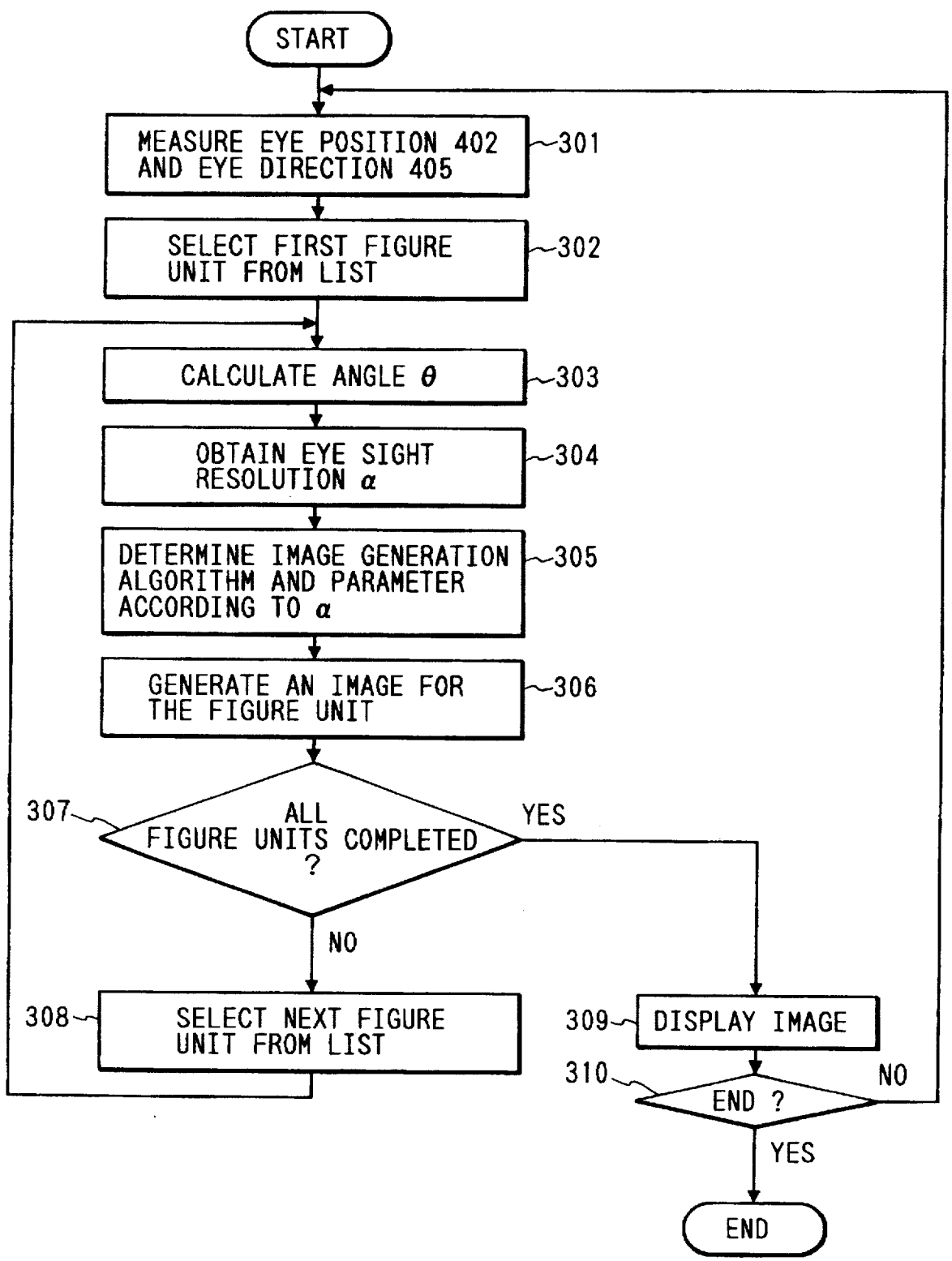
FIG. 3 is a flow-chart showing a flow of a process in the first embodiment of the present invention.

FIG. 3 is a flow-chart which shows a flow of an image display process in the first embodiment. Details of processing at each of the steps will be explained in order.

Figures 4, 5:
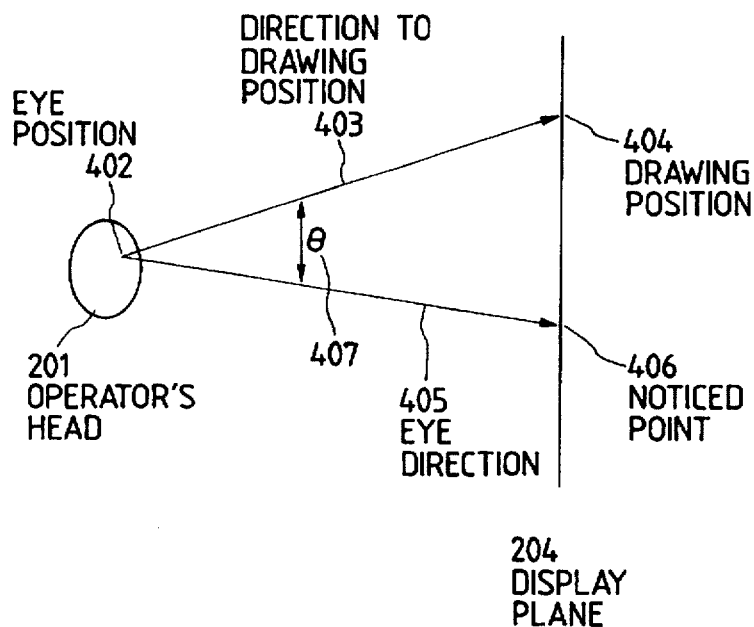
FIG. 4 is a view for explaining a positional relationship among an eye point, an eyesight and an image display plane in the first embodiment.
FIG. 5 is a view illustrating an example of a table for figure data in the first embodiment of the present invention.

First, at step 301, data for a figure unit to be first drawn are selected from the head of a figure data list which has been stored in the memory device in a form shown in FIG. 5. The items of figure data in the data list are an identification number of figure data, a type of a figure, an image data body and the like.

At step 303, an angle θ between a direction 403 from an eye position 402 shown in FIG. 4, to a position 404 where a figure unit is drawn on the screen, and the direction of the eye sight obtained at step 301 is calculated.

Figure 6:
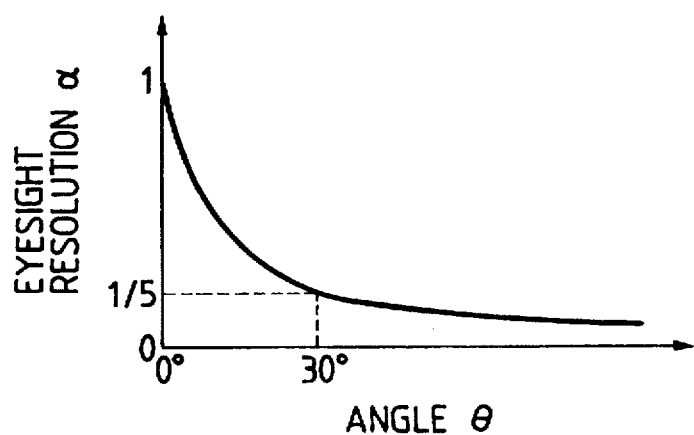
FIG. 6 is a view showing an example of a visual resolution curve in the first embodiment of the present invention.
Figure 7:
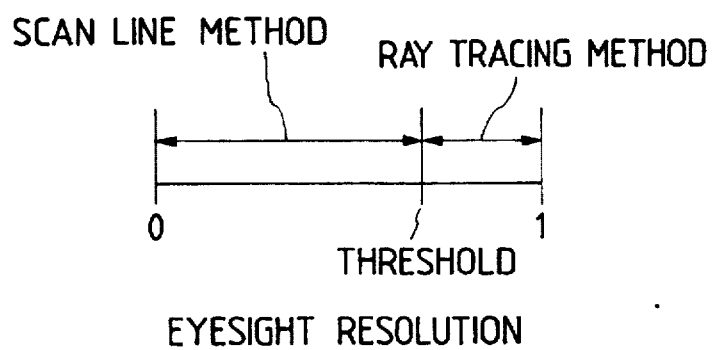
FIG. 7 is a view for explaining a content of selection for an image creating algorithm in the first embodiment of the present invention.

At step 304, a visual resolution α in a vision position making the angle of θ from the eye sight direction 405 is obtained. The value of the visual resolution α is defined so that it becomes highest within a few degrees from the center of the retina, as shown in FIG. 6, and exponentially decreases as the angle increases. The visual resolution which has a highest value at an angle of zero, that is, at the center of the retina is used as a reference, and the resolution is represented by the normalization with this reference. In this embodiment, the highest value of the resolution is set to 1, and the visual resolution is defined as a function or a data table relating to the angle θ.

At step 305, an image creating algorithm and parameters therefor are selected in accordance with the value of the visual resolution. Upon the selection, attention is to be paid such that an image of a part corresponding to the center of the retina is precisely created, and the further the distance from the center of the retina, the lower the relative burden of calculation becomes. In this embodiment, as the image creating algorithm, a scan line process is used if the visual resolution is below a preset threshold value, but a ray tracing process is used if the visual resolution is higher than the threshold value. Further, in this embodiment, as parameters, the detail particularity of the figure data varies in accordance with a visual resolution, as shown in FIG. 8.

The ray tracing process in which the burden of calculation is heavy, but a precise exhibition can be made, is applicable for drawing the center vision part. Meanwhile, the scan line process in which the function of exhibition is restricted, in comparison with the ray tracing process. However, the burden of calculation is light so as to be applicable for drawing the peripheral vision part.

In this embodiment, the detail particularity of figure data which is a parameter varies in accordance with a visual resolution, is that for controlling the density of figure data to be drawn. With the use of this detail particularity, a number of figure elements such as polygon patches and line segments which constitute a figure, can be stepwise changed over, at an image creating step which will be explained later.

At step 306, an image for a figure unit is created with the use of the algorithm and the parameters determined at step 305, and is accumulated in the frame buffer 102. In this embodiment, the following items as shown in FIG. 9 are controlled with the use of the detail particularity of the figure data as a control parameter.

Referring to FIG. 9, the number of polygons to be drawn, is a number of polygon patches constituting a figure to be drawn. If the detail particularity is high, the figure is precisely (finely) exhibited by drawing the figure with the use of a larger number of polygon patches.

Figure 10:
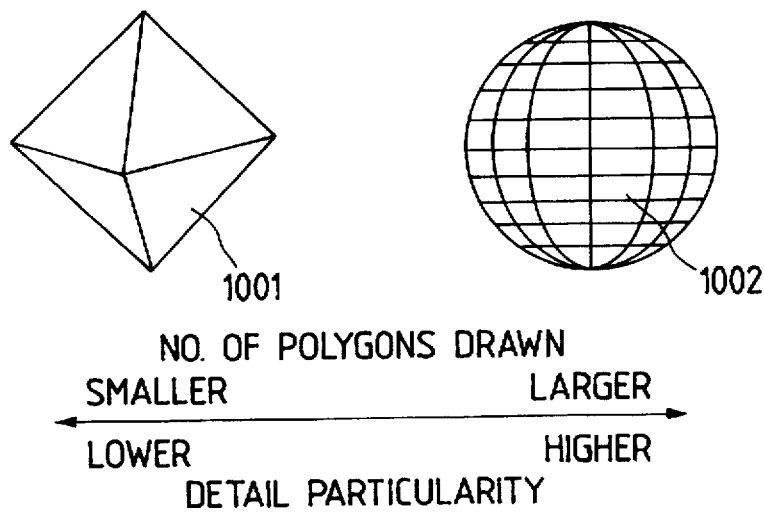
FIG. 10 is a view for explaining control of a number of polygons to be drawn in accordance with a detail particularity of figure data.

A shape 1002 shown in FIG. 10, gives an example in which a sphere is precisely approximated by several polygons. On the contrary, if the detail particularity is low, the drawing is made with a less number of polygon patches so as to reduce the burden of calculation for the drawing. A shape 1001 shown in FIG. 10, gives an example in which a sphere is briefly exhibited with a less number of polygons. There are considered two cases, that is, the case of suitably changing over polygon data which have been stepwise prepared, during drawing, and the case of changing the size of division when a surface such an arbitrary curved surface which is defined in a nonpolygon group form, is divided into polygons during the drawing.

A texture resolution shown in FIG. 9, gives a density of pixels in image data exhibiting a pattern of a figure, and accordingly, the higher the detail particularity, the larger the number of pixels are given so as to precisely exhibit the pattern.

Figure 11:
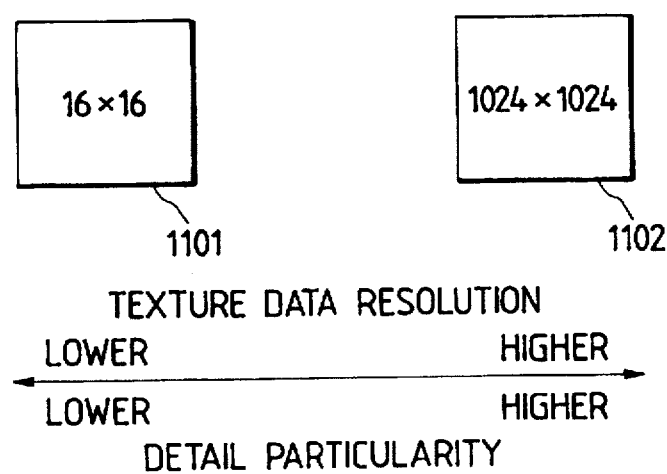
FIG. 11 is a view for explaining control of a texture resolution in accordance with a detail particularity of figure data.

A texture 1102 shown in FIG. 11, gives an example of texture data having a high resolution of 1024 pixels ×1,024 pixels. On the contrary, if the detail particularity is low, the number of pixels is decreased so as to reduce the burden of calculation for drawing. A texture 110 shown in FIG. 11 gives an example of texture data having a low resolution of 16 pixels and 16 pixels. At step 307, whether images for all figure units to be drawn are created or not is determined, if any of figure units to be drawn remains in the data list, at step 308, a figure unit to be drawn at the next time, is selected from the data list, and the procedure is similarly repeated from step 303. However, if it is determined that the image creating process is completed for all figure units at step 307, an image display process at step 309 is carried out, and accordingly, images accumulated in the frame buffer are exhibited on the image display apparatus.

At step 310, whether the operator instructs that the image display process is ended or not, is determined, and if no instruction is present, the procedure from the step 303 is repeated. Alternatively, if an instruction for ending the process is present, the process is completed.

(Other Embodiments)

Explanation will be hereinbelow made of other embodiments.

(Second Embodiment)

A second embodiment will be explained.

The basic arrangement of this embodiment can be shown by FIG. 1, similar to the first embodiment.

The positions of detectors in this embodiment, are shown in FIG. 2, similar to the first embodiment.

A flow-chart for indicating a flow of an image creating and displaying procedure in this embodiment is shown in FIG. 3, similar to the first embodiment, and the details of all process steps in this embodiment are the same as those explained in the first embodiment, except step 305.

The process at step 305 in this embodiment is essentially similar to that in the first embodiment, however, precisely, it is different therefrom.

At step 305 in the second embodiment, if the visual resolution is lower than a preset threshold value, a wire frame expressing process is selected, but if it is higher than the threshold value, a surface expressing process is selected.

The wire frame expressing process has an inferior function of expression but has a lower burden of calculation since a polygon shape can be drawn by its contour, and accordingly, it is applicable for expression in the peripheral vision part. Meanwhile, the surface expressing process has a burden of calculation, larger than that of the wire frame expressing process, but it can precisely exhibit a polygon shape, and accordingly, it is applicable for expression in the center vision part.

Further, the above-mentioned threshold can be arbitrarily changed.

Thus, the expression process is altered in view of the threshold value for the visual resolution, and accordingly, the process can be simplified. Further, by arbitrarily changing the threshold value, a figure to be displayed can be set to be fine or rough, that is, the representation can be made, suitable for its use purpose.

(Third Embodiment)

The basic arrangement of this embodiment is shown in FIG. 1, similar to the first embodiment.

The positions of detectors in this embodiment is shown in FIG. 2, similar to the first embodiment.

A flow-chart for indicating a flow of an image creating and displaying procedure in this embodiment is shown in FIG. 3, similar to the first embodiment, and the details of all process steps in this embodiment are the same as those explained in the first embodiment, except step 305.

The process at step 305 in this embodiment is essentially similar to that in the first embodiment, however, precisely, it is different therefrom.

In the third embodiment, at step 305, a drawing process is selected in such a way that if the visual resolution is below a preset threshold value, texture mapping is omitted, but if it exceeds the threshold value, the texture mapping is carried out.

The texture mapping has a large burden of calculation required for creating an image, but can enhance the quality of an image. Accordingly, it is suitable for expression in the center vision part. Further, the texture mapping is omitted in the peripheral vision part, thereby it is possible to greatly reduce the burden of calculation as a whole.

(Fourth Embodiment)

A fourth embodiment will be explained.

The basic arrangement of this embodiment is shown in FIG. 1, similar to the first embodiment.

The positions of detectors in this embodiment are shown in FIG. 2, similar to the first embodiment.

A flow-chart for indicating a flow of an image creating and displaying procedure in this embodiment is shown in FIG. 3, similar to the first embodiment, and the details of all process steps in this embodiment are the same as those explained in the first embodiment, except step 305.

The process at step 305 in this embodiment is essentially similar to that in the first embodiment, however, precisely, it is different therefrom.

Figure 12:
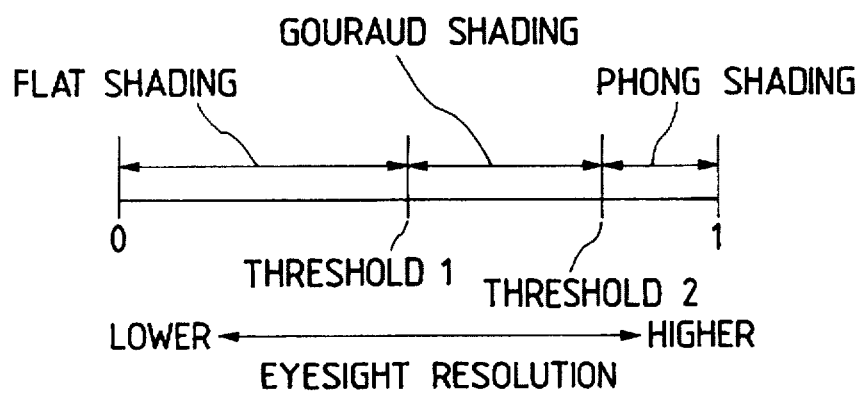
FIG. 12 is a view for explaining a selection for an image creating algorithm in a third embodiment of the present invention.

In the fourth embodiment, at step 305, a smooth shading process which is used during drawing, is changed over. The smooth shading process is a process which can represent smooth adjacent parts of polygons when a curved surface represented by a polygon approximation is drawn. As shown in FIG. 12, when the visual resolution is below a first threshold value, a flat shading process is selected, and a Gouraud shading process is selected if it is between first and second threshold values, but a Phong shading process is selected if it exceeds the second threshold value.

In the Phong shading process, although the burden of calculation is relatively large, the representation by curved surface approximation with the use of polygons can be effectively carried out. Accordingly, the Phong shading process is applicable for drawing a part where the visual resolution is high. Meanwhile, the flat shading process is a process in which no smooth shading is carried out. With this process, a curved surface obtained by a polygonal approximation is exhibited to be square so as to be visually inferior, but the burden of calculation is small. Accordingly, this process is applicable for drawing a part where the visual resolution is low. Further, the Gouraud shading process is positioned between the above-mentioned Phong shading process and the flat shading process in view of the burden of calculation and the quality of a created image, and accordingly, it is applicable for drawing a part where the visual resolution is intermediate.

(Fifth Embodiment)

A fifth embodiment will be explained.

The basic arrangement of this embodiment is shown in FIG. 1, similar to the first embodiment.

The positions of detectors in this embodiment are shown in FIG. 2, similar to the first embodiment.

A flow-chart indicating a flow of an image creating and displaying procedure is shown in FIG. 3, similar to the first embodiment, in which the details of all process steps are similar to those explained in the first embodiment, except step 305.

The process at step 305 in this embodiment is essentially similar to that in the first embodiment, however, precisely, it is different therefrom.

In the selection of parameters at step 305 in the fifth embodiment, the maximum number of reflection of a light beam in the case of execution of rate tracing calculation is set to be large if the visual resolution is high, but is set to be small if it is low.

When an image is created by the rate tracing, the quality of the image can be enhanced by setting the number of reflection of a light beam to be large, and accordingly, the rate tracing is applicable for drawing in the center vision part. Meanwhile, the burden of calculation is reduced in the peripheral vision part by reducing the number of reflection.

(Sixth Embodiment)

A sixth embodiment will be explained.

The basic arrangement of this embodiment is shown in FIG. 1, similar to the first embodiment.

The positions of detectors in this embodiment are shown in FIG. 2, similar to the first embodiment.

A flow-chart indicating a flow of an image creating and displaying procedure is shown in FIG. 3, similar to the first embodiment, in which the details of all process steps are similar to those explained in the first embodiment, except step 305.

The process at step 305 in this embodiment is essentially similar to that in the first embodiment, however, precisely, it is different therefrom.

At step 305 in the sixth embodiment, if the visual resolution is above a preset threshold value, a mode in which a figure to be drawn is drawn to be semitransparent, is selected, and meanwhile, if it is below the threshold value, a anode in which an opaque matter is drawn to be opaque is selected.

If a body shape having a complicated internal structure is drawn to be semitransparent, the burden of calculation is increased although the internal structure can be easily understood. A semitransparent representation is made in the center vision area, but normal drawing is carried in the peripheral vision part so as to reduce the burden of calculation.

(Seventh Embodiment)

A seventh embodiment will be explained.

The basic arrangement of this embodiment is shown in FIG. 1, similar to the first embodiment.

The positions of detectors in this embodiment are shown in FIG. 2, similar to the first embodiment.

A flow-chart indicating a flow of an image creating and displaying procedure is shown in FIG. 3, similar to the first embodiment.

Further, details in all process steps in this embodiment are similar to those explained in any one of the first to sixth embodiments.

The positions of detectors are different from those in the first embodiment.

Figure 13:
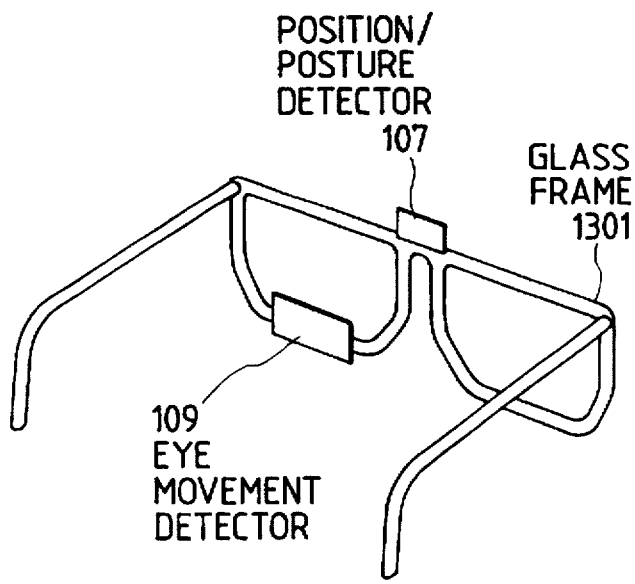
FIG. 13 is a view illuminating a fixture holder for detectors in a seventh embodiment of the present invention.

In the first embodiment, as shown in FIG. 2, a detector holder 203 is the one adapted to be set on the head of the operator. On the contrary, in this embodiment, as shown in FIG. 13, a detector holder has a frame which is glasses frame-like and on which a position and posture detector and an eye movement detector set on the effective eye side are fixed.

It is noted that the effective eye side can be determined by the operator who recognizes which one of his eyes is effective, and the eye movement detector is fixed to the effective eye side of the frame.

(Eighth Embodiment)

Eighth embodiment will be explained.

Figure 14:
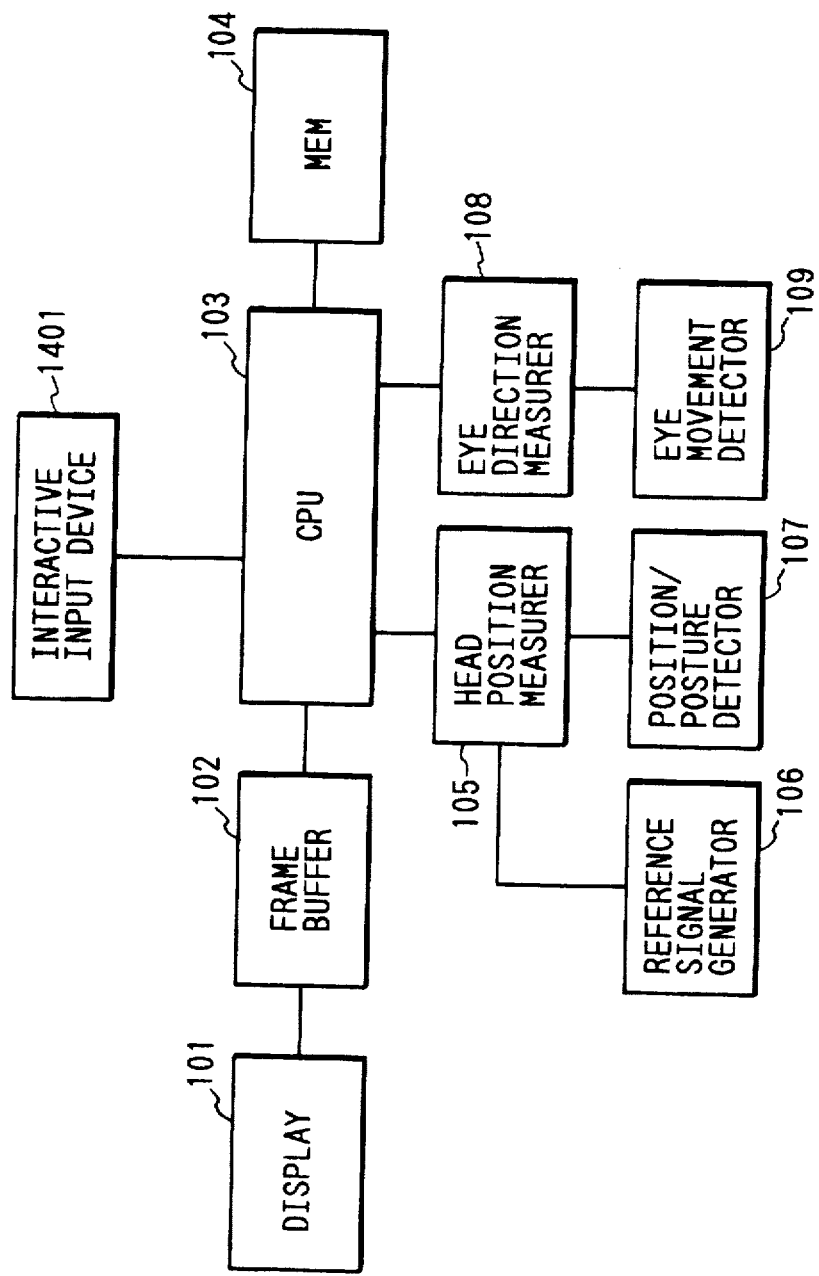
FIG. 14 is a block diagram illustrating an arrangement in an eighth embodiment of the present invention.
Figure 15:
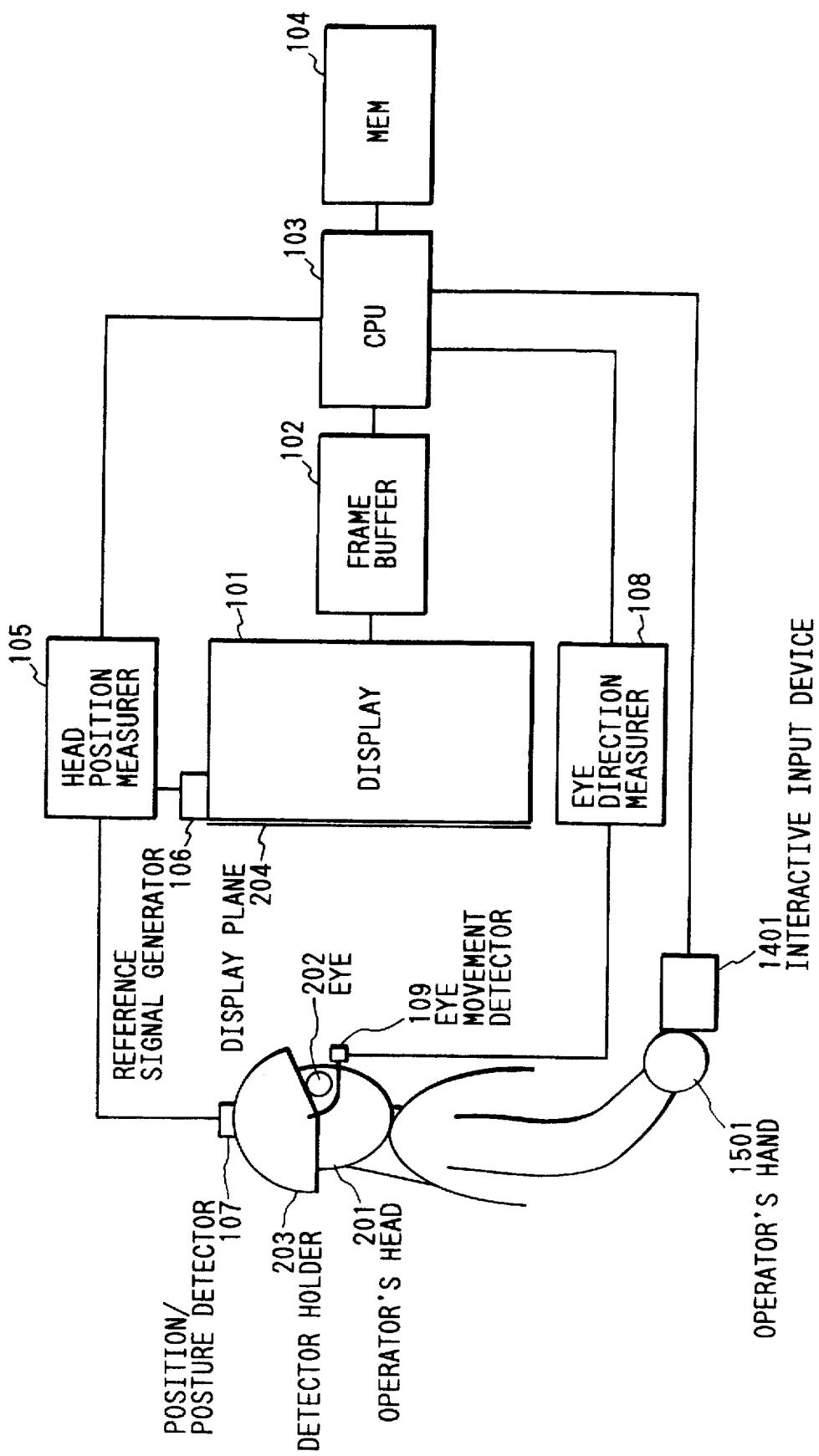
FIG. 15 is a view for explaining schematic positions of detectors in the eighth embodiment of the present invention.

The basic arrangement of the present invention is shown in FIG. 14. The basic arrangement of this embodiment has an interactive input device 1401 in addition to the basic arrangement of the first embodiment. The interactive input device 1401 is a device adapted to reflect a motion of the operator in the content of a process, such as a mouse, a keyboard, a dial box, a three-dimensional sensor or an eye sight input device. The positions of devices in this arrangement are shown in FIG. 15. The arrangement of the devices in this arrangement has the interactive input device 1401 in addition to the arrangement of the devices in the first embodiment. A detector holder may be similar to that in the seventh embodiment.

Figure 16:
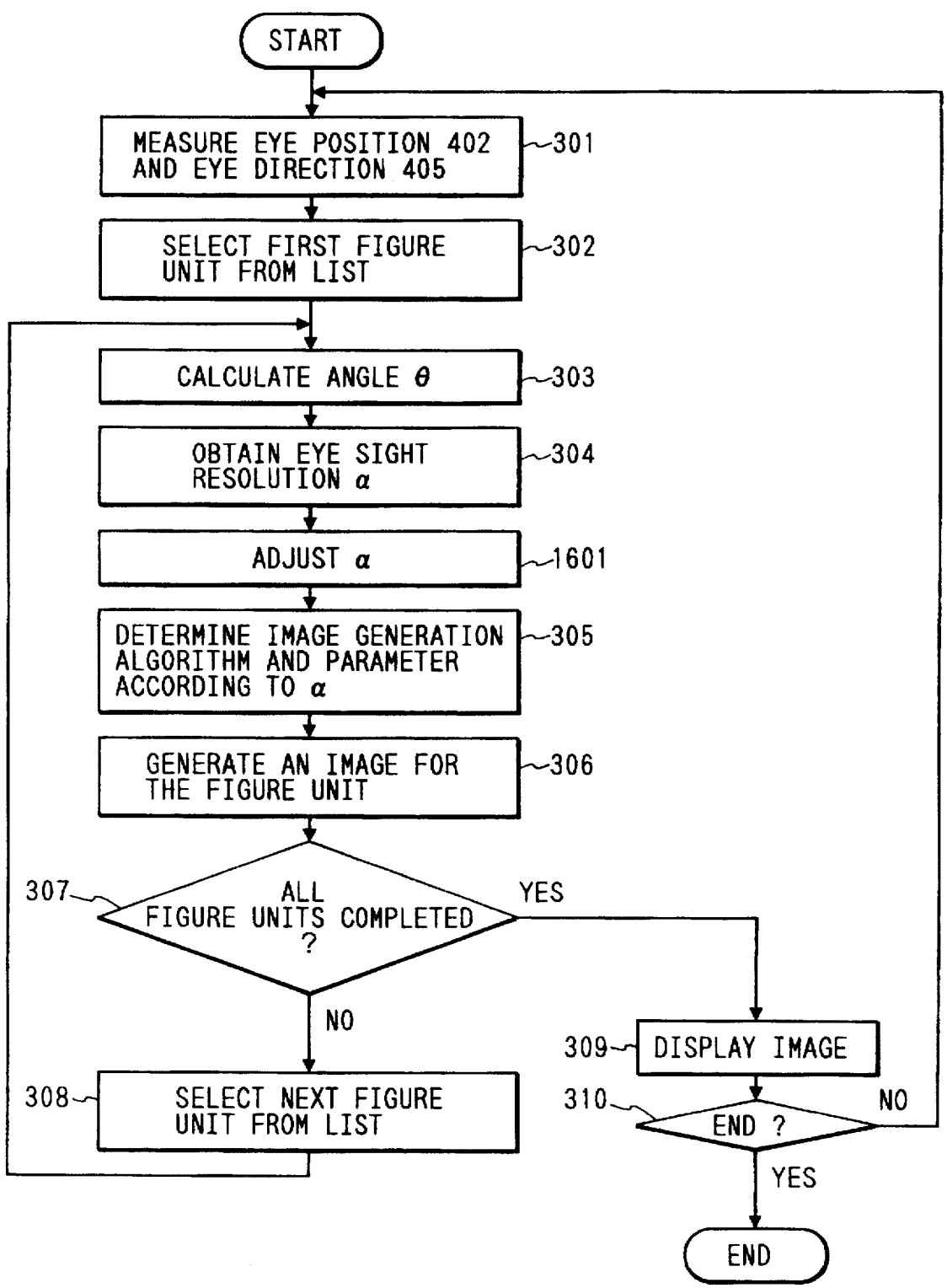
FIG. 16 is a flow-chart showing a flow of a process in the eighth embodiment.

FIG. 16 shows a flow-chart indicating a flow of an image creating and displaying procedure in this embodiment. In the flow-chart in this embodiment, step 1601 is added to the flow-chart in the first embodiment. The details of the procedure in this embodiment is similar to that explained in the first embodiment, or in any one of the second to sixth embodiments, except additional step 1601.

A detailed explanation will be made of the process at step 1601.

At step 1601, the value of the visual resolution determined at the previous step 304 is adjusted in consideration with another factor which greatly affects the visual characteristic of the operator. The above-mentioned another factor in consideration is, at first, such a case that the relative angle between the direction of the eye sight and the direction from the eye position to a figure varies. The lowering of the eyesight resolution caused in this case, is in general known as "moving body eyesight". This situation is caused by the movement of a figure, the rotation of the figure, or a variation in the eye sight direction.

At step 1601, the adjustment is made such that the value of the visual resolution is multiplied by a coefficient which is larger than 0 but less than 1 so as to aim at reducing the burden of calculation by simplifying the creation of an image.

Thus, in this embodiment, it is possible to enhance the real-time ability while maintaining the quality of an image perceived by the operator at a high level.

Further, a situation to be considered, in addition to the moving body eyesight, is such a case that the responsiveness of the interactive operation is sometimes required, rather than the image quality, only during interactive operation at the input device 1401 by the operator. In this case, in addition to the consideration with the moving body eyesight, the value of the visual resolution is adjusted to be lower at step 1601 during the interactive operation, thereby it is possible to aim at enhancing the responsiveness by simplifying the creation of an image.

As mentioned above, according to the present invention, the human eyesight characteristic in which the eyesight is high in the center part of the field of vision, but is low in the peripheral part thereof is used, and accordingly, there can be presented such an advantage that the burden of calculation for an image is reduced as a whole, and a more satisfactory image can be represented to the operator.

What is claimed is:

1. A real-time image display method comprising:
    a first step of identifying each of a plurality of parts of an image to be displayed on a display screen, with a vision position which falls in a vision field of an operator;
    a second step of determining a visual resolution at each vision position identified at said first step, at least two different visual resolutions being determined;
    a third step of using determining means for creating said image and parameters therefor for each of the identified parts of said image in accordance with said visual resolutions identified at said second step;
    a fourth step of creating an image of each of said vision parts by use of said determining means and said parameters determined at said third step, images of at least two parts having different visual resolutions;
    a fifth step of storing the images created at said fourth step in a memory; and
    a sixth step of reading the images stored in the memory at said fifth step and displaying the read images on the display screen.

2. A real-time image display method as set forth in claim 1, wherein at said first step, a position and a direction of a display screen on a display unit are used as a reference; the direction of an eyesight of the operator is defined as a first direction while a direction from an eye point of the operator to a point on said display screen is defined as a second direction so as to measure the eye point and the direction of the eyesight of the operator; an angle in a horizontal vision field direction between the first and second directions, and an angle of a vertical vision field direction are obtained for each of a plurality of parts on said display screen; and a position in the vision field, onto which each of the parts of said image falls is identified in accordance with the thus obtained two angles.

3. A real-time image display method as set forth in claim 2, wherein at said second step, approximation for an eyesight characteristic is carried out such that the visual resolution is identical at positions having angles from the center of a vision field which are substantially equal to each other.

4. A real-time image display method as set forth in claim 1, wherein a value which is obtained by normalizing a visual resolution at the center of the retina of the operator with a reference value which is determined to be maximum, is used as a representative value of visual resolution.

5. A real-time image display method as set forth in claim 2, wherein as said first step, the eye point and the direction of eyesight are measured in accordance with an effective eye of the operator.

6. A real-time image display apparatus comprising:
    eyesight measuring means for measuring an eye point and a direction of eyesight of an operator with reference to a display screen;
    relative angular velocity calculating means for calculating time-variation in an angle between the direction of eyesight obtained by said eyesight measuring means, and a direction from said eye point to drawing data;
    moving body eyesight determining means for determining a moving body eyesight at the time when the operator perceives the drawing data, in accordance with a relative angular velocity obtained by said relative angular velocity calculating means, and for selecting at least two different visual resolutions according to the determined moving body eyesight;
    drawing technique selecting means for determining at least two techniques for creating an image and parameters therefor in accordance with the visual resolutions selected by said moving body eyesight determining means;
    image creating means for creating an image of said drawing data by use of said techniques and said parameters determined by said drawing technique selecting means and for storing the created image; and
    image display means for displaying said image stored in said image creating means on the display screen.

7. A real-time image display apparatus as set forth in claim 6, wherein said moving body eyesight determining means uses a value which is obtained by normalizing an eyesight at the time when said relative angular speed is zero, with a reference value which is determined to be maximum, as a representative value of moving body eyesight.

8. A real-time image display apparatus as set forth in claim 7, wherein said eyesight measuring means measures an eye point and a direction of eyesight of the operator, being based upon an effective eye of the operator.

9. A real-time image display apparatus comprising:
    first means for identifying each of a plurality of parts of an image to be displayed on a display screen, with a vision position which falls in a vision field of an operator;
    second means for determining a visual resolution at each vision position identified by said first means, at least two different visual resolutions being determined;
    third means for determining at least two techniques for creating said image and parameters therefor for each of vision parts of said image in accordance with said visual resolutions identified at said second means;
    fourth means for creating an image of each of said vision parts by use of said techniques and said parameters determined by said third means;
    fifth means for storing images corresponding to each of the vision parts created by said fourth means; and
    sixth means for reading the images stored in said fifth means and displaying the read images together on the display screen.

10. A real-time image display apparatus as set forth in claim 9, wherein in said first means, a position and a direction of a display screen on a display unit are used as a reference; the direction of an eyesight of the operator is defined as a first direction while a direction from an eye point of the operator to a point on said display screen is defined as a second direction so as to measure the eye point and the direction of the eyesight of the operator; an angle in a horizontal vision field direction between the first and second directions, and an angle of a vertical vision field direction are obtained for each of parts on said display screen; and a position in the vision field, onto which each of the parts of said image falls is identified in accordance with said thus obtained two angles.

11. A real-time image display apparatus as set forth in claim 9, wherein in said second means, an approximation for an eyesight characteristic is carried out such that the visual resolution is identical at positions having angles from the center of a vision field which are substantially equal to each other.

12. A real-time image display apparatus as set forth in claim 9, wherein a value which is obtained by normalizing a visual resolution at the center of the retina of the operator with a reference value which is determined to be maximum, is used as a representative value of visual resolution.

13. A real-time image display apparatus as set forth in claim 10, wherein as said first step, the eye point and the direction of eyesight are measured in accordance with an effective eye of the operator.

14. An image processing apparatus comprising:

detection means for detecting a position on a display screen at which an operator is looking;

first determination for determining a center area of a predetermined size including the position detected by said detection means and another area different from the center area;

second determination means for determining a first image generation algorithm for a first image to be displayed on the center area and a second image generation algorithm for a second image to be displayed on the another area, the first and second image generation algorithms being different from each other;

image generation means for generating the first and second images using the first and second image generation algorithms, respectively, determined by said second determination means, and for storing the first and second images; and display control means for reading the stored first and second images, and for causing display of the first and second images together on the display screen.

15. Apparatus according to claim 14, wherein said second determination means determines the first and second image generation algorithms such that a resolution of the first image is higher than that of the second image.

16. Apparatus according to claim 14, wherein said detection means detects the position on the display screen at which the operator is looking with an eye more skillfully than the other.

17. Apparatus according to claim 14, wherein the first image generation algorithm comprises a tracing method and the second image generation comprises a scan line method.

18. Apparatus according to claim 15, wherein said second determination means determines the first and second image generation methods in units of figures to be displayed in each area.

19. An image processing method comprising the steps of:

detecting a position on a display screen at which nnan operator is looking;

a first step of determining a center area of a predetermined size including the detected position and another area different from the center area;

a second step of determining a first image generation algorithm for a first image to be displayed on the center area and a second image generation algorithm for a second image to be displayed on the another area, the first and second image generation algorithms being different from each other;

generating the first and second images using the determined first and second image generation algorithms, respectively, and storing the generated first and second images; and controlling a display means to read the first and second stored images and to display together the generated first and second images on the display screen.

20. A method according to claim 19, wherein said second determining step determines the first and second image generation algorithms such that a resolution of the first image is higher than that of the second image.

21. A method according to claim 19, wherein said detecting step detects the position on the display screen at which the operator is looking with an eye more skillful than the other.

22. A method according to claim 19, wherein the first image generation algorithm comprises a tracing method and the second image generation algorithm comprises a scanned line method.

23. A method according to claim 20, wherein said second determining step determines the first and second image generation algorithms in units of figures to be displayed in each area.

* * * * *

UNITED STATES PATENT AND TRADEMARK OFFICE
CERTIFICATE OF CORRECTION

PATENT NO. : 5,715,384                              Page 1 of 2
DATED      : February 3, 1998
INVENTOR(S): OHSHIMA ET AL.

It is certified that error appears in the above-indentified patent and that said Letters Patent is hereby corrected as shown below:

On title page,
Item [75]

"Chiqasaki" should read --Chigasaki--.

Column 4

Line 14, "angle 8" should read --angle θ--.

Column 7

Line 29, "reflection" should read --reflections--.

Column 7

Line 51, "anode" should read --a mode--.

Column 8

Line 18, "Eighth" should read --An eighth--.

Column 9

Line 43, "thus" should read --thus- --.

UNITED STATES PATENT AND TRADEMARK OFFICE
CERTIFICATE OF CORRECTION

PATENT NO.    : 5,715,384
DATED         : February 3, 1998
INVENTOR(S)   : OHSHIMA, ET AL.

It is certified that error appears in the above-indentified patent and that said Letters Patent is hereby corrected as shown below:

<u>Column 12</u>

Line 6, "nnan" should read --an--.

Signed and Sealed this

Third Day of November, 1998

Attest:

BRUCE LEHMAN

Attesting Officer     Commissioner of Patents and Trademarks